(12) United States Patent
Adams et al.

(10) Patent No.: US 8,796,930 B2
(45) Date of Patent: Aug. 5, 2014

(54) LED DEVICE WITH POWER REMOVAL DETECTION AND METHOD FOR USING THE SAME

(75) Inventors: Stephen Adams, Mesa, AZ (US); Jim Rhodes, Chandler, AZ (US)

(73) Assignee: JST Performance, Inc., Gilbert, AZ (US)

(*) Notice: Subject to any disclaimer, the term of this patent is extended or adjusted under 35 U.S.C. 154(b) by 264 days.

(21) Appl. No.: 13/227,211

(22) Filed: Sep. 7, 2011

(65) Prior Publication Data

US 2013/0057160 A1    Mar. 7, 2013

(51) Int. Cl.
*B60Q 1/26*    (2006.01)

(52) U.S. Cl.
USPC .................. 315/80; 315/82; 315/307

(58) Field of Classification Search
USPC ........... 315/77, 291, 294, 297, 307, 312, 360, 315/80, 82; 340/815.45
See application file for complete search history.

(56) References Cited

U.S. PATENT DOCUMENTS

| 8,138,941 | B2* | 3/2012 | Smith et al. ............... 340/815.45 |
| 8,319,433 | B2* | 11/2012 | Lin et al. ........................ 315/77 |
| 2006/0146553 | A1 | 7/2006 | Zeng |
| 2007/0097700 | A1 | 5/2007 | Pederson |
| 2008/0129206 | A1* | 6/2008 | Stam et al. ..................... 315/82 |
| 2009/0045754 | A1 | 2/2009 | Jozwik |
| 2009/0121651 | A1* | 5/2009 | Gandhi ........................ 315/291 |

OTHER PUBLICATIONS

Australian Patent Office. Nov. 27, 2012. 5 pages.
Australian Patent Office. Apr. 22, 2013. 5 pages.
Canadian Intellectual Property Office, Office action dated Dec. 9, 2013, 4 pages.

* cited by examiner

*Primary Examiner* — Tung X Le

(57) ABSTRACT

An LED lamp is placed in service on an automotive vehicle to enhance nighttime visual ability or anywhere where increased lighting is needed. The LED lamp utilizes a multi-stage power and control design, where the LED drive current is managed by an LED constant current controller that is coupled to a microprocessor that commands the intensity value of an LED array. The microprocessor manages the light intensity of the LED array using well known pulse-width modulation control methods. The microprocessor measures the voltage of the DC power source and to detect when DC power is removed. Once this detection has occurred, the microprocessor signals the LED current controller to change the current operational mode being delivered to the LED array to the next available operational mode, or alternatively, to the next appropriate operational mode to be used as determined by software stored within the microprocessor.

5 Claims, 4 Drawing Sheets

LED DEVICE WITH POWER REMOVAL DETECTION AND METHOD FOR USING THE SAME

BACKGROUND

1. Field of the Technology

The disclosure relates to the field of LED lighting devices, specifically LED devices with multiple functional modes.

2. Description of the Prior Art

Lamps, flashlights, and other similar lighting devices employing one or more light emitting diodes (LEDs) have long been used for a multitude of purposes ranging from street lamps and searchlights to lighting on vehicles. Many of these previously known LED lights comprise multiple user selected modes including various flashing or strobe settings, multiple intensity settings, or any number of other preprogrammed patterns or displays.

However a problem has developed with the use of LED devices that contain multiple lighting modes, particularly those LED devices that are used in conjunction with vehicles. Specifically, previous vehicular LED devices require both a power and a ground wire, increasing the cost and complexity of the device. Furthermore, many LED devices with multiple lighting modes require a constant small amount of power to operate, even when the LED display is completely turned off. This is extremely critical when the LED device is installed on a vehicle as power is finite and can affect other aspects of the vehicle's overall performance.

What is needed is an LED lighting device that contains a plurality of lighting modes that does not require a small amount of constant power even when turned off or a ground wire in order to keep costs and complexity at a minimum.

BRIEF SUMMARY

The current invention includes a vehicular lighting apparatus that works in combination with a vehicular source of electrical power. The lighting apparatus includes a lighting array having a plurality of operational modes, a microprocessor to control the lighting array, and means for selecting one of a plurality of the operational modes to be performed by the lighting array.

The lighting apparatus also includes means for detecting when the electrical power source has been disconnected from the lighting array.

Preferably, the lighting array is an LED lighting array and includes a LED current controller which is connected to both the LED lighting array and to the microprocessor. The plurality of operational modes that may be performed by the lighting array includes operating with a first constant intensity, operating with a second constant intensity, strobing with a first frequency, strobing with a second frequency, cycling with increasing and decreasing intensity, operating at a user defined intensity, and nonoperating.

In another embodiment, the lighting apparatus includes a second electrical power source which is connected to the microprocessor.

In yet another embodiment, the lighting apparatus also includes an input sensor connected to the microprocessor. The input sensor which is connected to the microprocessor may a temperature sensor, a movement sensor, or a timer.

In yet another embodiment, the microprocessor of the lighting apparatus includes a memory storage device.

The current invention also includes a method for operating a lamp comprising mounting the lamp to an external surface, applying primary power from an external power source to the lamp, detecting the application of primary power from the external power source, performing a first operational mode with the lamp, changing the first operational mode of the lamp to a second operational mode of the lamp, and then finally removing primary power from the lamp.

In one embodiment, the method specifies that the lamp is an LED array. This embodiment also states that changing the first operational mode performed by the lamp to a second operational mode performed by the lamp includes storing a residual amount of power in a temporary power source connected to the LED array, removing primary power from the LED array, and selecting the second operational mode from a plurality of available operational modes stored within a memory storage device before power stored in the temporary power source is depleted. The selected second operational mode is then stored in the memory storage device before power stored in the temporary power source is depleted and primary power is then reapplied to the LED array. Finally, the selected second operational mode is performed through the LED array. In one particular embodiment, selecting the second operational mode further includes cycling through the plurality of available operational modes stored within the memory storage device.

In another embodiment, the method step of removing the primary power from the LED lamp further includes selecting a second operational mode from a plurality of available operational modes stored within a memory storage device and storing the selected second operational mode in the memory storage device before temporary power is depleted. The plurality of available operational modes to be selected comprises operating with a first constant intensity, operating with a second constant intensity, strobing with a first frequency, strobing with a second frequency, cycling with increasing and decreasing intensity, operating with a user defined intensity, and nonoperating.

In yet another embodiment, the method further includes applying a second external power source to the LED lamp and detecting the application of power from the second external power source. This embodiment further includes that the changing the first operational mode performed by the LED array to a second operational mode performed by the LED array includes selecting the second operational mode upon coupling to the second external power source.

In yet another embodiment, the method step of selecting the second operational mode from a plurality of available operational modes stored within a memory storage device before temporary power is depleted includes measuring an external parameter with an input sensor, determining if the measured external parameter is within a predetermined threshold, and then preventing the second operational mode from being performed by the LED array if the measured parameter is not within the predetermined threshold. The operational mode performed by the LED array may then be altered if the measured parameter is not within the predetermined threshold.

The invention further includes an LED apparatus with an LED array capable of operating in a plurality of modes, an LED current controller connected to the LED array, and a microprocessor with a memory connected to the LED current controller to select one of the plurality of modes of operation of the LED array. At least one external power source is also connected to the microprocessor in order to provide power to the LED apparatus.

In one embodiment, the microprocessor of the apparatus selects one of a plurality of operational modes performable by the LED array as controlled by software stored within the memory of the microprocessor when triggered by disruption of power from the external power source.

In another embodiment, the microprocessor of the apparatus contains means for cycling the operation of the LED array through the plurality of operational modes, the operational mode being stepped through the cycle each time the external power source is electrically disconnected from the microprocessor.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
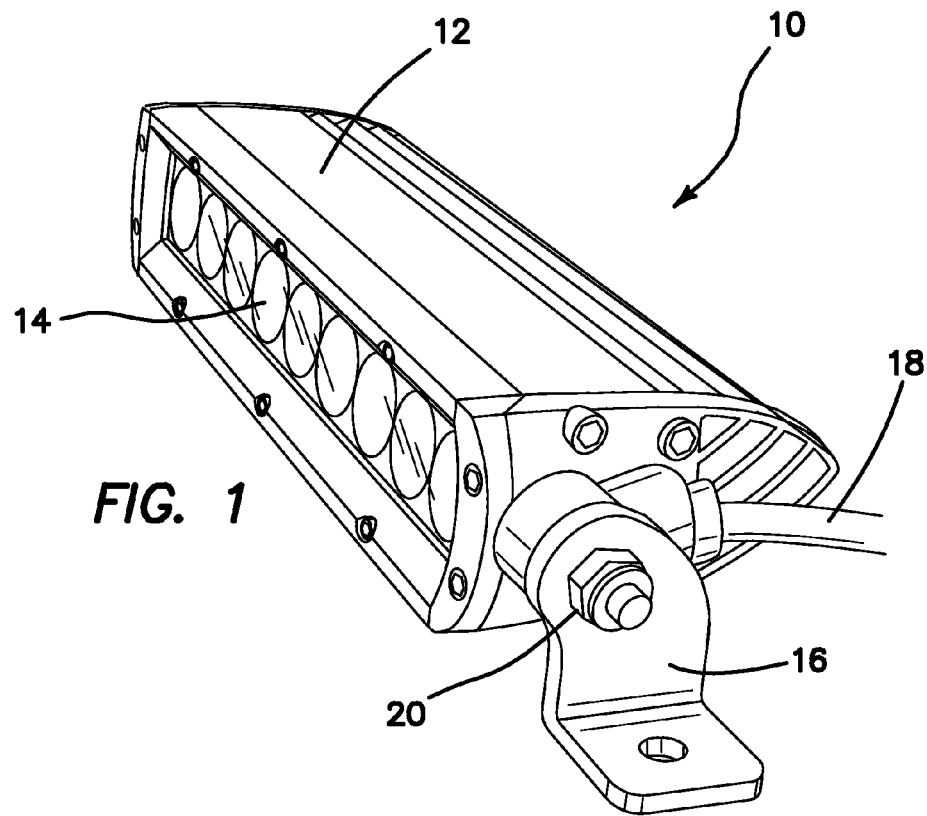
FIG. 1 is a perspective view of the LED lamp of the current invention.
Figure 2:
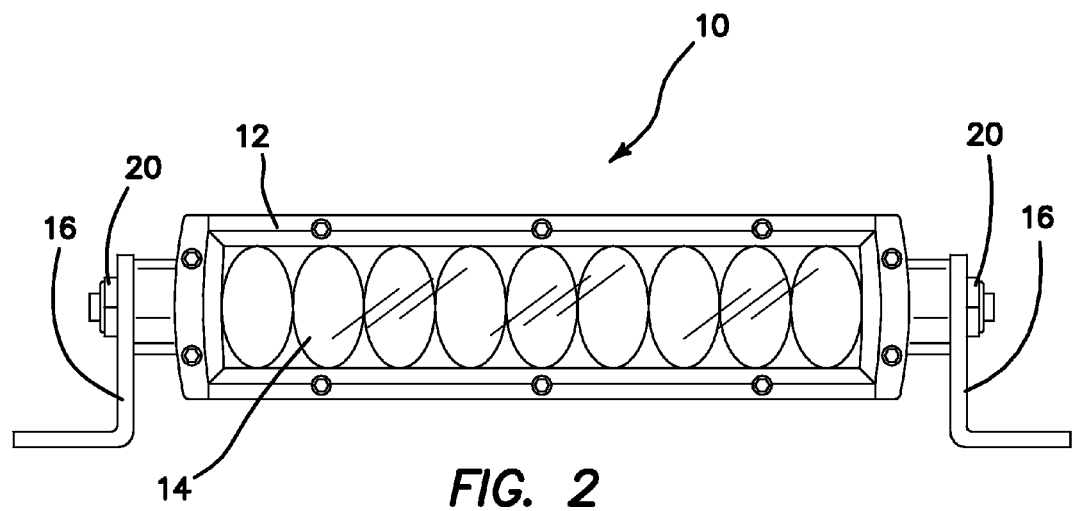
FIG. 2 is a frontal view of the LED lamp seen in FIG. 1.

A perspective view of the current invention may be seen in FIG. 1 where an LED lamp is denoted in general by reference numeral 10. The LED lamp 10 comprises a body 12 with an LED array 14 substantially disposed across its frontal longitudinal surface as best seen in FIG. 2. The LED array 14 is a standard lighting array comprised of a plurality of LEDs which are adjacently coupled together by means well known in the art. Coupled to either end of the body 12 is an adjustable mounting bracket 16 that are used to couple the LED lamp 10 to an external surface such as a vehicle dashboard or roof. When both mounting brackets 16 are firmly coupled to the external surface as is known in the art, the body 12 may be rotated about a pair of bolts 20 threaded through each of the mounting brackets 16, thus giving a user the ability to adjust the LED array 14 to a desired angle with respect to the external surface. Also coupled to the body 12 is a power cable 18 which is used to connect the LED lamp 10 to an outside or vehicular power source (not seen).

Figure 3:
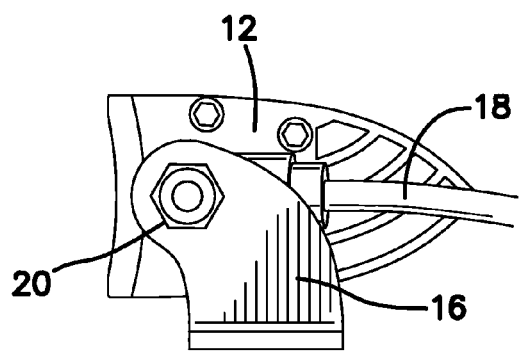
FIG. 3 is a right lateral view of the LED lamp seen in FIG. 1.
Figure 4:
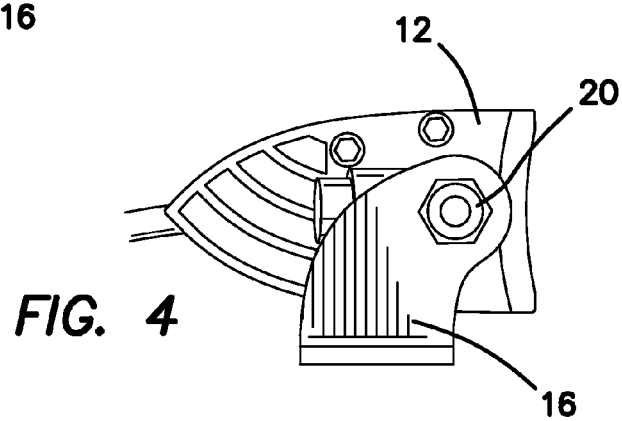
FIG. 4 is a left lateral view of the LED lamp seen in FIG. 1.

The body 12 of the LED lamp 10 is preferably comprised of a rigid, durable metal or metal alloy in a substantially "tear drop" cross-sectional shape as best seen in the side views of FIGS. 3 and 4. It is to be expressly understood however that other shapes or external designs of the body 12 of the LED lamp 10 other than what is shown in the figures may be used without departing from the original spirit and scope of the invention.

Figure 5:
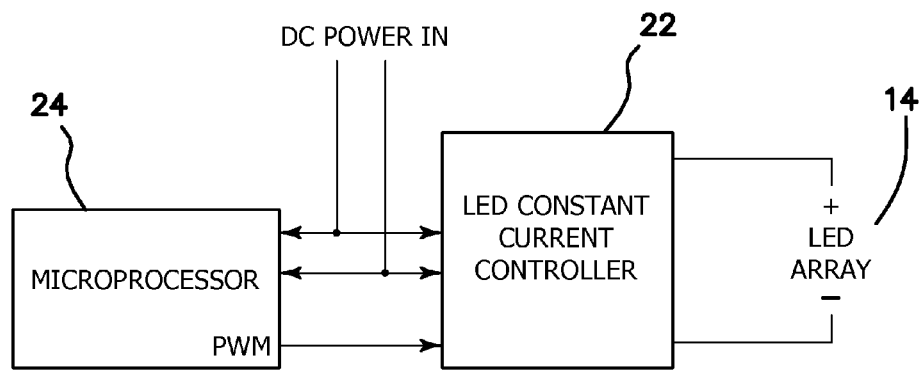
FIG. 5 is a block diagram of the internal circuitry of the LED lamp of the current invention highlighting the relationship between the microprocessor, LED current control, and LED array.

The power cable 18 delivers power to the internal electronics of the LED lamp 10 contained within the body 12 as best seen in the block diagram of FIG. 5. As seen in FIG. 5, the LED lamp 10 comprises an LED constant current controller 22 coupled to the LED array 14. In turn, a microprocessor 24 is coupled to the LED current controller 22, both of which are powered by the outside DC power source.

The current device is normally placed in service on an automotive vehicle to enhance nighttime visual ability, however the LED lamp 10 may be placed in service almost anywhere where increased lighting is needed. The LED lamp 10 utilizes a multi-stage power and control design where the LED drive current is managed by the LED constant current controller 22 that is coupled to the microprocessor 24 that commands the intensity value of the LED array 14.

The microprocessor 24 manages the light intensity of the LED array 14 using well known pulse-width modulation (PWM) control methods, where the LED current controller 22 accepts such control. The microprocessor 24 utilizes an analog method well known in the art to measure the voltage of the incoming DC power source and to detect when DC power is removed. Once this detection has occurred, the microprocessor 24 signals the LED current controller 22 to change the current operational mode being performed by the LED array 14 to the next available operational mode, or alternatively, to the next appropriate operational mode to be used as determined by software stored within the microprocessor 24. In addition to detecting when the power is removed from the LED lamp 10, the microprocessor 24 can also be programmed to change or rotate operational modes when power is applied to the LED lamp 10 via the power cable 18.

The operational mode which is selected by the microprocessor 24 and sent to the LED current controller 22 may be any one of a plurality of operational modes including but not limited to: solid on with a high intensity, solid on with a low intensity, flashing or strobe with a plurality of pre-determined patterns, slow cycling of intensity, off, and a user selected intensity.

The microprocessor 24 is capable of managing almost any light intensity pattern, including flashing or strobing at a plurality of frequencies and intensity patterns. The microprocessor 24 comprises a FLASH memory data storage (not shown) where parameters of the LED lamp 10 can be stored, such as an operational mode and PWM values that determine the output intensity of the LED array 14. One or more capacitors, or other sources of temporary power, (not shown) coupled to the power pins of the microprocessor 24 allows for the microprocessor 24 to maintain operation up to a few hundred microseconds after removal of the external power source allowing for software decisions to be made after power is removed. For example, if the LED lamp 10 is operating with the LED array 14 at a constant high intensity operational mode and then the power is removed by the user, the microprocessor 24 detects the power removal and selects the next operational mode stored within it, for example a constant low intensity. After the next operational mode has been selected, the one or more capacitors within the microprocessor 24 discharge and all power flow within the LED lamp 10 is depleted. When power is reapplied to the LED lamp 10, the LED current control 22 resumes the previously selected operational mode selected by the microprocessor 24 before the capacitors fully displeted, and in this example, allowing the LED array 14 to output illumination at a constant low intensity. This process may be repeated each time power is removed and reapplied to the LED lamp 10, with the microprocessor 24 cycling through each of the operational modes stored within the microprocessor 24 every time the external DC power is removed. In another embodiment, the power cable 18 is not completely removed from the LED lamp 10 but rather power is simply switched off by the user by means of a switch or other well known circuit breaking means. Regardless of how the power is removed however, the LED lamp 10 does not require additional low amounts of current when in the off or non-operational mode. This allows the LED lamp 10 to be installed on vehicles and in other applications where power is finite and where its consumption of power is critical.

Figure 8:
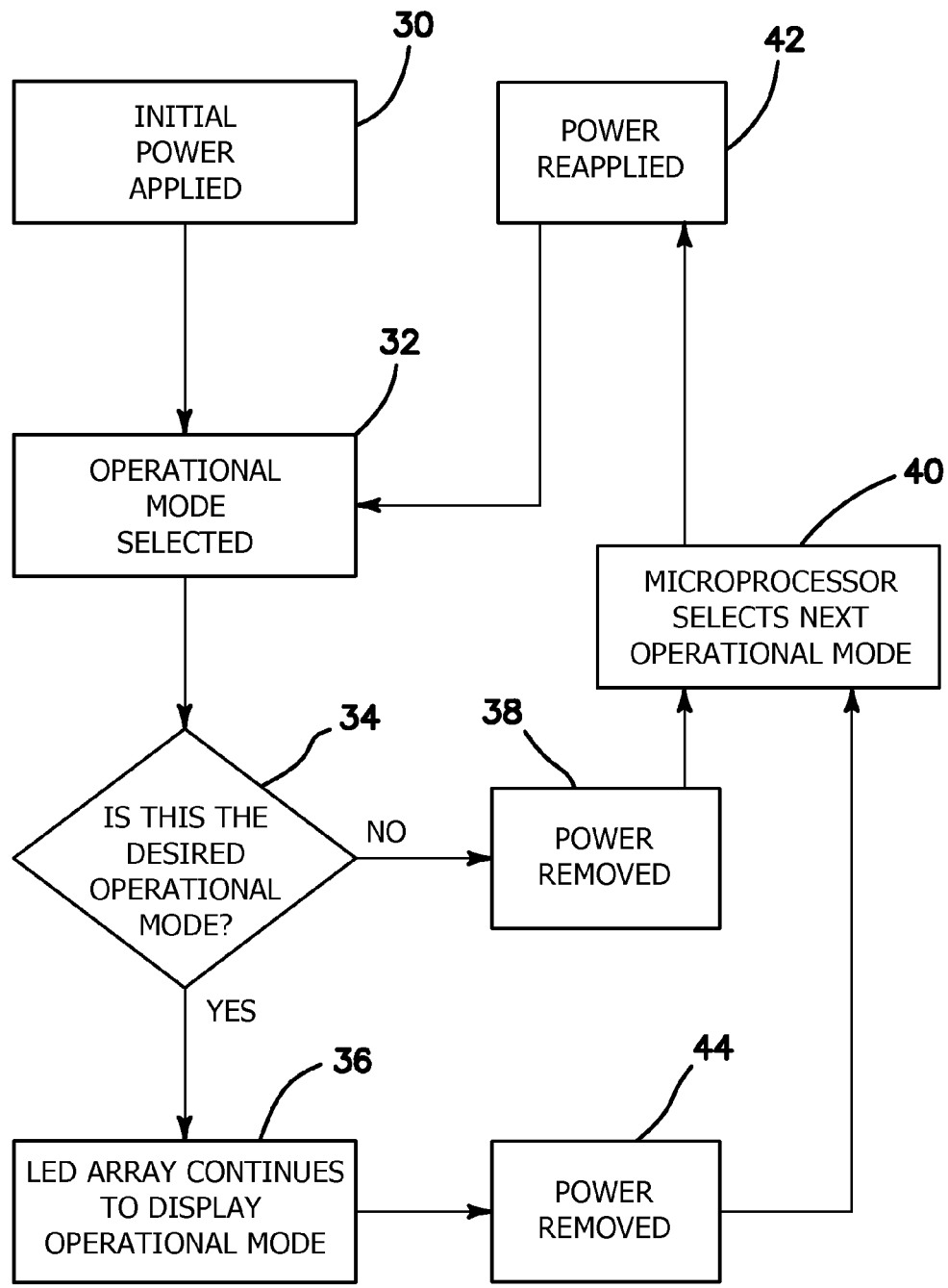
FIG. 8 is a flow chart demonstrating the operational method of use for the LED lamp of the current invention.

Further detail of the function of the LED lamp 10 and its method of operation may be had by turning to the flow diagram of FIG. 8. Power from an outside DC source is first applied to the LED lamp 10 in step 30. Power may applied by plugging in a power cable 18 from an outside source, or by the manipulation of a switch by a user. Once power is applied, the microprocessor 24 signals the LED current control 22 to perform an operational mode through the LED array 14 in step 32. In step 34, the user visually observes the LED array 14 and makes a determination if the current operational mode being performed is desirable or not. If so, the LED array 14 in step 36 is permitted to continue performing the current operational mode for as long as the LED lamp 10 is in use. Eventually, when use of the LED lamp 10 is no longer desired, power is removed from the LED lamp 10 at step 44.

If however the user determines in step 34 that the current operational mode is not desirable, power is removed from the LED lamp 10 in step 38. As discussed above, capacitors or other sources of temporary power provide up to a few hundred microseconds of additional power to the microprocessor 24 which then selects the next available operational mode stored within its internal memory in step 40 before all power within the LED lamp 10 is depleted. The user then reapplies power in step 42, reactivating the microprocessor 24 which signals the LED current control 22 in step 32 to perform the operational mode that was previously selected by the microprocessor 24 in step 40 before the capacitors fully depleted. This cycle of the removing and reapplying power may be repeated by the user until the desired operational mode is performed through the LED array 14.

In one embodiment, one of the plurality of operational modes allows the user to set a user defined output intensity of the LED array 14 using the power on and off sensing mechanism described above. The user first sets the device mode to a slow ramp up and slow ramp down operational mode by power cycling the microprocessor 24 until this mode is selected. The LED current controller 22 now slowly ramps the intensity of the LED array 14 from off to full, and then back again from full to off. When the user visually sees the desired intensity level of the LED array 14, the user simply removes power from the LED lamp 10. The microprocessor 24 senses this power removal, and immediately stores the intensity value (PWM value) currently being generated to internal storage memory and sets the next operational mode to be used as a "user set intensity." When power is reapplied to the LED lamp 10, the microprocessor 24 commands the LED current controller 22 to the previous preset current value which is then passed on and performed by the LED array 14.

Figure 6:
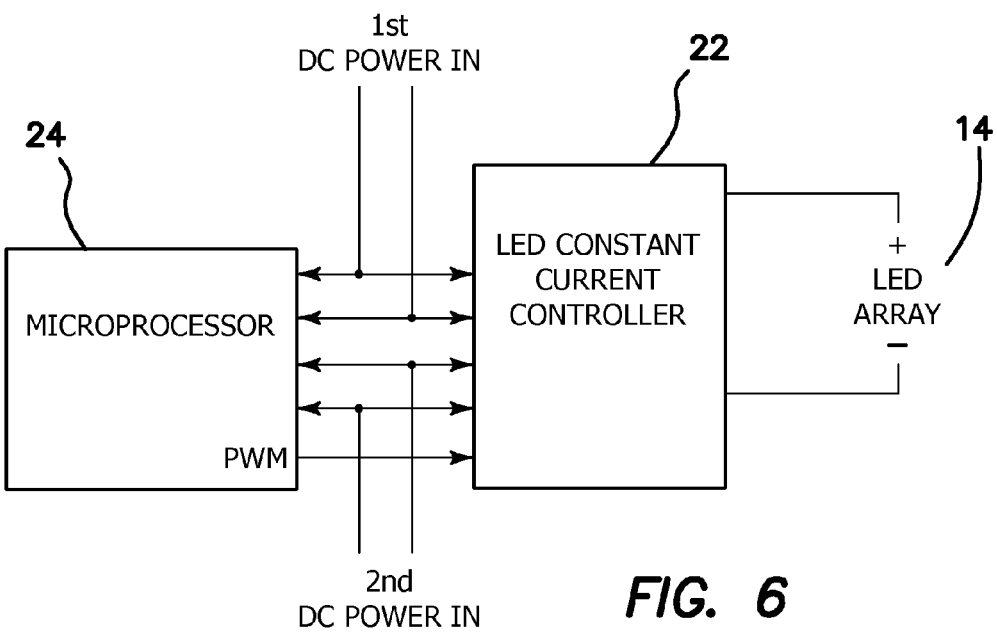
FIG. 6 is a block diagram of an alternative embodiment of the internal circuitry of the LED lamp comprising a second DC power source.

In another embodiment, the LED lamp 10 comprises a second power input seen in FIG. 6 with its own separate power cable 18 or switch. In this embodiment, the microprocessor 24 comprises means for determining which one of the power switches was activated and in what sequence and acts accordingly. Either power source can carry the current necessary for powering the internal electronics of the LED lamp 10 and allow for the microprocessor 24 to ascertain what is the next required operational mode.

Figure 7:
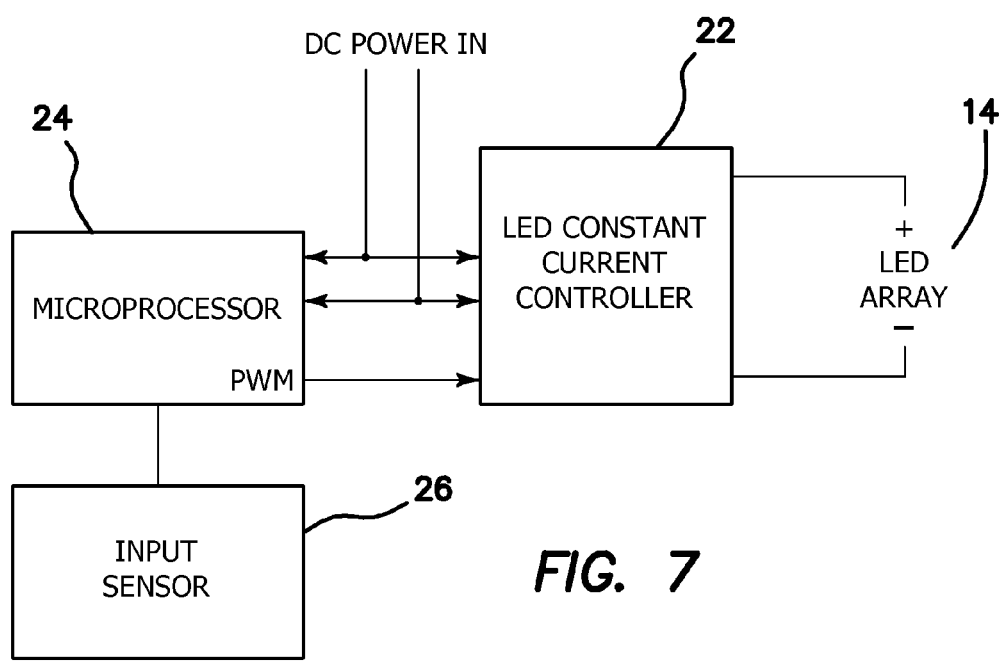
FIG. 7 is a block diagram of an alternative embodiment of the internal circuitry of the LED lamp comprising an input sensor coupled to the microprocessor.

In yet another embodiment seen in FIG. 7, the internal electronics of the LED lamp 10 comprises an additional input sensor 26 coupled to the microprocessor 24. The input sensor 26 may be any one or plurality of different sensors known in the art including but not limited to a temperature sensor, photo detector, and motion sensors.

For the purposes of illustration, the below description will assume that the input sensor 26 is a temperature sensor, however it is to be expressly understood that any other sensors listed above or other sensors now known or later devised may be used in a similar manner without departing from the original spirit and scope of the invention. The input sensor 26 provides the microprocessor 24 additional information or parameters which must be met before the LED array 14 may be activated as discussed above. For example, if the input sensor 26 is a temperature sensor, the internal temperature of the LED lamp 10 may be measured and then recorded in the microprocessor 24. If the internal temperature of the LED lamp 10 is measured to be above a certain predetermined threshold temperature stored within the microprocessor 24, the microprocessor 24 may manipulate and override the LED current control 22 so that the LED array 14 is not allowed to reach higher intensity levels or be activated at all. Once the internal temperature of the LED lamp 10 has dropped beneath the predetermined threshold temperature as measured by the temperature input sensor 26, the microprocessor 24 will allow the LED current control 22 to once again operate the LED array 14 at higher intensity levels or according to the presently selected operational mode.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for operating a lamp comprising:
    mounting the lamp to an external surface;
    applying primary power from an external power source to the lamp;
    detecting the application of primary power from the external power source;
    performing a first operational mode with the lamp;
    changing the first operational mode of the lamp to a second operational mode of the lamp; and
    removing primary power from the lamp, wherein the lamp is an LED array and wherein changing the first operational mode of the lamp to a second operational mode of the lamp includes,
        storing a residual amount of power in a temporary power source coupled to the LED array;
        removing primary power from the LED array;
        selecting the second operational mode from a plurality of available operational modes stored within a memory storage device before power stored in the temporary power source is depleted;
        storing the selected second operational mode in the memory storage device before power stored in the temporary power source is depleted;
        reapplying primary power to the LED array; and
        performing the selected second operational mode through the LED array.

2. The method of claim 1 where selecting the second operational mode further comprises cycling through the plurality of available operational modes stored within the memory storage device.

3. The method of claim 1 where the plurality of available operational modes to be selected comprises:
    operating with a first constant intensity;
    operating with a second constant intensity;
    strobing with a first frequency;
    strobing with a second frequency;
    cycling with increasing and decreasing intensity;
    operating with a user defined intensity; and
    nonoperating.

4. The method of claim 1 where selecting the second operational mode from a plurality of available operational modes stored within a memory storage device before temporary power is depleted comprises:
    measuring an external parameter with an input sensor;
    determining if the measured external parameter is within a predetermined threshold; and
    preventing the second operational mode from being performed by the LED array if the measured parameter is not within the predetermined threshold.

5. The method of claim 4 further comprising altering the operational mode performed by the LED array if the measured parameter is not within the predetermined threshold.

* * * * *